(12) United States Patent
Ba et al.

(10) Patent No.: US 11,644,212 B2
(45) Date of Patent: May 9, 2023

(54) MONITORING AND OPTIMIZING HVAC SYSTEM

(71) Applicant: International Business Machines Corporation, Armonk, NY (US)

(72) Inventors: Amadou Ba, Navan (IE); Joern Ploennigs, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 148 days.

(21) Appl. No.: 17/096,627

(22) Filed: Nov. 12, 2020

(65) Prior Publication Data

US 2022/0146136 A1 May 12, 2022

(51) Int. Cl.
*F24F 11/64* (2018.01)
*F24F 11/38* (2018.01)

(52) U.S. Cl.
CPC .............. *F24F 11/64* (2018.01); *F24F 11/38* (2018.01)

(58) Field of Classification Search
CPC .......... F24F 11/64; F24F 11/38; G05B 15/00; G05D 23/19
See application file for complete search history.

(56) References Cited

U.S. PATENT DOCUMENTS

| | | | |
|---|---|---|---|
| 6,223,544 B1 | 5/2001 | Seem | |
| 8,731,724 B2 | 5/2014 | Drees | |
| 8,788,097 B2 | 7/2014 | Drees | |
| 9,638,436 B2 | 5/2017 | Arensmeier | |
| 9,995,501 B2 | 6/2018 | Quam | |
| 10,467,327 B1* | 11/2019 | Arazi | G06Q 30/02 |
| 10,903,778 B2* | 1/2021 | Nojima | G05B 17/02 |
| 11,080,613 B1* | 8/2021 | Camara | G06N 20/00 |
| 2012/0330465 A1* | 12/2012 | O'Neill | F24F 11/30 700/276 |
| 2014/0257575 A1 | 9/2014 | Roy | |
| 2014/0277757 A1 | 9/2014 | Wang | |
| 2015/0227870 A1* | 8/2015 | Noboa | G06Q 10/0635 705/7.28 |
| 2015/0292985 A1 | 10/2015 | Yenni | |
| 2015/0378373 A1 | 12/2015 | Sprinkle | |
| 2016/0187896 A1 | 6/2016 | Jones | |
| 2016/0217674 A1 | 7/2016 | Stewart | |
| 2017/0227973 A1* | 8/2017 | Schnetter | G01R 33/31 |
| 2018/0367320 A1 | 12/2018 | Montalvo | |
| 2019/0024928 A1 | 1/2019 | Li | |

(Continued)

FOREIGN PATENT DOCUMENTS

| | | |
|---|---|---|
| CA | 2344908 C | 6/2010 |
| CN | 105783203 B | 11/2018 |
| KR | 20120069737 A | 6/2012 |

*Primary Examiner* — Santosh R Poudel
(74) *Attorney, Agent, or Firm* — Monchai Chuaychoo

(57) ABSTRACT

An approach for monitoring, detecting and localizing anomalies of HVAC system by using the combination of thermodynamics models, the energy balance of a zone in steady state, and data analytics is disclosed. The approach determines, via machine learning, the ideal thermodynamic model for an area serviced by an HVAC system. The approach retrieves reading from various sensors and insert the current sensor reading into the ideal model. In the presence of anomalies, the parameters of the model will deviate from their nominal values and an appropriate action can be taken based on the severity of the detected and localized anomalies.

11 Claims, 5 Drawing Sheets

(56) References Cited

U.S. PATENT DOCUMENTS

2019/0041078 A1     2/2019  Harpale
2020/0413139 A1*   12/2020  Ickin ................... H04N 21/442
2021/0383042 A1*   12/2021  Harvey ................. G05B 13/04

* cited by examiner

US 11,644,212 B2

MONITORING AND OPTIMIZING HVAC SYSTEM

BACKGROUND

The present invention relates generally to HVAC (Heat Ventilation Air Condition) system, and more particularly to dynamically adjusting parameters for efficiency and monitoring faults.

Heating, ventilation, and air conditioning (HVAC) is a device and/or system of providing a targeted temperature and/or air quality for human comfort inside a structure and/or vehicular environmental. HVAC system design can rely on the principles of thermodynamics, fluid mechanics and heat transfer. HVAC can be installed in commercial structures (e.g., industrial and office buildings, etc.) and as well as part of residential structures (e.g., single family homes, apartment buildings, etc.). A vehicular environment can include cars, trains, airplanes, ships and submarines.

SUMMARY

Aspects of the present invention disclose a computer-implemented method, a computer system and computer program product for identifying faults within a HVAC system. The computer implemented method may be implemented by one or more computer processors and may include: retrieving, by a one or more computer processors, one or more parameters associated with a zone; creating, by the one or more computer processors, an ideal thermodynamic model for the zone based on the one or more parameters; retrieving, by the one or more computer processors, a plurality of sensor data from an HVAC system associated with the zone; calculating, by the one or more computer processors, model data representing a first portion of the plurality of sensor data based on executing the ideal thermodynamic model with a second portion of the plurality of sensor data; determining, by the one or more computer processors, if the model data is equal to a predetermined fault threshold; responsive to the model data not being within the predetermined fault threshold, identifying, by the one or more computer processors, one or more faults based on an identity of the first portion of the plurality of sensor data; and notifying, by the one or more computer processors, one or more users based on the identified one or more faults.

According to another embodiment of the present invention, there is provided a computer system. The computer system comprises a processing unit; and a memory coupled to the processing unit and storing instructions thereon. The instructions, when executed by the processing unit, perform acts of the method according to the embodiment of the present invention.

According to a yet further embodiment of the present invention, there is provided a computer program product being tangibly stored on a non-transient machine-readable medium and comprising machine-executable instructions. The instructions, when executed on a device, cause the device to perform acts of the method according to the embodiment of the present invention.

BRIEF DESCRIPTION OF THE DRAWINGS

Preferred embodiments of the present invention will now be described, by way of example only, with reference to the following drawings, in which.

DETAILED DESCRIPTION

Figure 1:
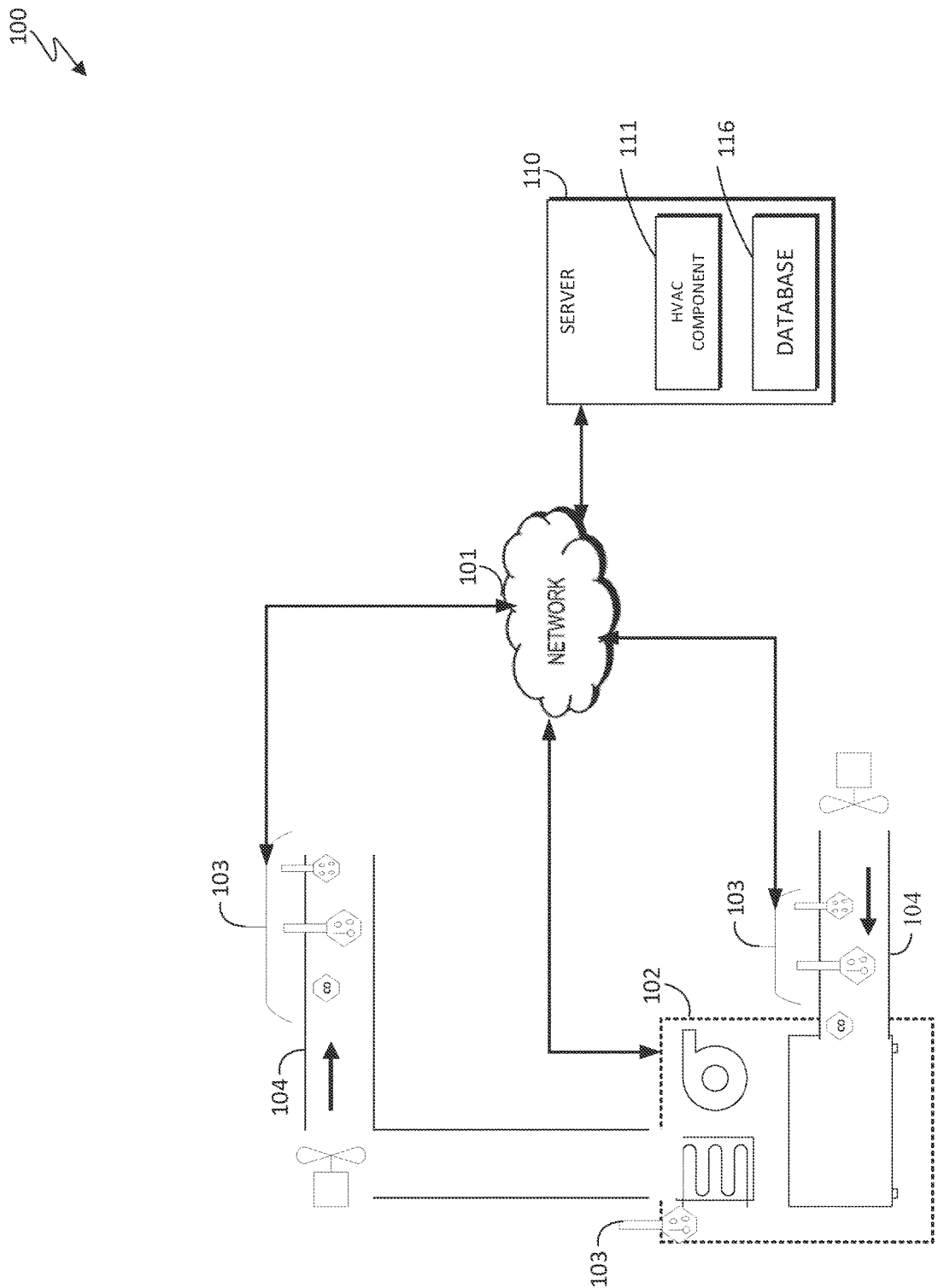
FIG. 1 is a functional block diagram illustrating a high level overview of the HVAC environment, designated as 100, in accordance with an embodiment of the present invention.

In the current HVAC state of art, the existing fault detection and diagnosis techniques do allow to detect anomalies but do not allow online detection and localization of faults, and therefore make impossible the implementation of fast and efficient corrective measures. There is no use of online analytics with adaptive tuning parameters to monitor HVACs in buildings, and perform real-time detection and localization of anomalies in HVACs. Tuning parameters are parameters that belongs to an algorithm that can be adjusted to improve the performance of the AI (artificial intelligence) algorithm and models. Anomalies occur in HVACs and consequently alter energy efficiency, affect the user's comfort, increase operational cost, hence the need for monitoring approaches to prevent unplanned downtime of HVACs. Furthermore, there is no efficient adaptation to non-stationarities, which could be symptomatic to anomalies in HVACs systems. Online monitoring of the physical parameters of HVACs can overcome these limitations, and the association of the residuals of HVACs with change-point detection methods will ensure the reliability in the detection and localization of anomalies.

Embodiments of the present invention recognize the deficiencies in the current state of art and provides an approach for monitoring, detecting and localizing anomalies of HVAC system by using the combination of thermodynamics models, the energy balance of a zone in steady state, and data analytics. The approach determines, via machine learning, the ideal thermodynamic model(s) for a zone of a floor, other zones of the floor and other floors throughout a structure (e.g., buildings, restaurants, transportation vehicles, etc.) serviced by an HVAC system. The approach retrieves reading from various sensors (e.g., airflow temperature, airflow pressure and speed, outside/inside air temperature, inside/outside humidity, inside air pressure, etc.) located throughout the HVAC infrastructure and can insert the current sensor reading into the ideal model(s). In the presence of anomalies, the parameters of the model will deviate from their nominal values (i.e., the parameters of the mass balance equation will change to a new and inappropriate values for the optimal operation and performance of the HVAC system). Anomalies can include, but are not limited to, impossibility to set normal heating (temperature too high/too low), inappropriate ventilation and air conditioning due to the valve problem, broken air duct, stuck valve, furnace burner is out and condenser/chiller isn't circulating the refrigerant, etc. The embodiment can alert the users on the anomalies (based on the sensor reading) and an appropriate action can occur. However, another reason besides anomalies on why the ideal thermodynamic model did maintain its nominal parameters (i.e., reach steady state) can be attributed to something simple and minor. For example, someone left the shades open on the floor and the sunshine warmed up the room very quickly (no clouds that day) and the steady state of the model was not achieved in a timely manner. Thus, embodiment does not need to send an alert to the user and can try to regulate (i.e., automatically adjust settings) the HVAC system by lowering the floor temperature (i.e., increase air conditioning flow) based on the sudden increase in the room temperature of the floor. Essentially, embodiment can display the measurements, calculate/forecast predictions and monitor results of the HVAC system.

Other embodiments of the present invention may recognize one or more of the following facts, potential problems, potential scenarios, and/or potential areas for improvement with respect to the current state of the art: i) rapid and efficient decision making whenever abnormalities occur in HVACs, ii) rapid implementation of corrective measures, iii) the recursive nature of the algorithms enable edge-deployment, iv) reduction of the cost of monitoring, v) recording systems send the results of monitoring to the reading devices only in case of abnormal operation of HVACs, vi) ensure continuously that energy savings are performed due to the normal operation of HVACs systems, vii) ensure continuously that the user comfort is satisfied and viii) easy integration with enterprise asset management software solution.

In other embodiments of the present invention can comprise of a dual system, recorders and an HVAC monitoring system, for detecting the onset of abnormalities in HVACs. The recorder, records HVACs measurements, weather and building characteristics, determine the physical model and compute the online residuals and detect early abnormal events, when present. In case of abnormal event detection, the recorder notifies the monitoring system (e.g., computer, mobile phones) about the presence of anomalies. The residuals are the differences between the actual measurement and the same measurement computed by the model.

In other embodiments of the present invention can allow an early detection of abnormal energy consumption. The prediction methods making the tuning parameters adaptive, to capture at the earliest stage the presence of anomalies in HVACs. The predictions are determined for each sensor (covariate), then the computation of the associated residuals take place.

In other embodiments of the present invention can limit the cost of deployment in the context of large buildings by utilizing recorder devices that can integrate prediction and anomaly detection capabilities, and directly outputting the monitoring results based on the fast tuning parameters and detection results.

In other embodiments of the present invention, the recorder component can incorporate extra capabilities (i.e., edge computing) to do the scoring of the AI models (i.e., trained in the cloud) in order to deliver the prediction and the anomaly detection results. The recorder will also be able to notify operators about the anomaly detection results (presence or not of anomalies). During the process, the AI algorithm uses adaptive tuning parameters to accelerate the process of anomaly detection.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether or not explicitly described.

It should be understood that the Figures are merely schematic and are not drawn to scale. It should also be understood that the same reference numerals are used throughout the Figures to indicate the same or similar parts.

FIG. 1 is a functional block diagram illustrating a HVAC environment 100 in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

HVAC environment 100 includes network 101, HVAC 102, sensors 103, HVAC duct 104 and server 110.

Network 101 can be, for example, a telecommunications network, a local area network (LAN), a wide area network (WAN), such as the Internet, or a combination of the three, and can include wired, wireless, or fiber optic connections. Network 101 can include one or more wired and/or wireless networks that are capable of receiving and transmitting data, voice, and/or video signals, including multimedia signals that include voice, data, and video information. In general, network 101 can be any combination of connections and protocols that can support communications between server 110, sensors 103 and other computing devices (not shown) within HVAC environment 100. It is noted that other computing devices can include, but is not limited to, sensors 103, HVAC duct 104 and any electromechanical devices capable of carrying out a series of computing instructions.

HVACs 102 can be one or multiple HVAC systems for a residential and commercial application. HVAC can include the following components, but it is not limited to, heat pump, thermostat, AHU (air handler unit), air filtration and air conditioning (A/C) system, which can include, A/C condenser, A/C evaporator. HVACs 102 can include components (as part of an AHU) such as HVAC duct 104. HVAC duct 104 are hollow tubes (e.g., circular or rectangular) that allow cool or hot air to be distributed from HVAC or returned through an air filtration unit before going back into the HVAC.

Sensors 103 can be any device (e.g., IoT, camera, etc.) used for detecting faults and/or anomalies (e.g., blocked duct, heat pump not working, etc.) within an HVAC system (i.e., HVACs 102), including duct system. Sensors 103 detect the following: objects, chemical compounds/elements, auditory signals, electromagnetic signal and images, temperature sensor, air pressure sensor, air quality, and chemical. Furthermore, sensors 103 can also detect/record/report on the following but it is not limited to, zone temperature, supply air temperature, return air temperature, mixed air temperature, fan speed, reheat valve command, damper command, etc. Data collected by sensors 103 can be saved locally to a storage device and/or stream in real-time for storage by a database (e.g., cloud storage, database 116, etc.).

Server 110 can be a standalone computing device, a management server, a web server, a mobile computing device, or any other electronic device or computing system capable of receiving, sending, and processing data. In other embodiments, server 110 can represent a server computing system utilizing multiple computers as a server system, such as in a cloud computing environment. In another embodiment, server 110 and digital twin server 105 can be a laptop computer, a tablet computer, a notebook computer, a personal computer (PC), a desktop computer, a personal digital assistant (PDA), a smart phone, or any other programmable electronic device capable of communicating other computing devices (not shown) within HVAC environment 100 via network 101. In another embodiment, server 110 represents a computing system utilizing clustered computers and components (e.g., database server computers, application server computers, etc.) that act as a single pool of seamless resources when accessed within HVAC environment 100.

Embodiment of the present invention can reside on server 110. Server 110 includes HVAC component 111 and database 116.

HVAC component 111, leverage machine learning, provides the capability of, i) determining the ideal thermodynamic model for a room, ii) reading and recording measurements data from sensors 103, iii) detecting and localizing faults and anomalies, iii) analyzing the measurements data to calculate and update HVAC operating parameters based on the combination of thermodynamics models, the energy balance of a zone in steady state, and analytics, iv) notify users of the faults and new calculated HVAC operating parameters and v) dynamically adjust the HVAC operating parameters. Subcomponents of HVAC component 111 will be discussed in greater details associated with FIG. 2.

Database 116 is a repository for data used by HVAC component 111. Database 116 can be implemented with any type of storage device capable of storing data and configuration files that can be accessed and utilized by server 110, such as a database server, a hard disk drive, or a flash memory. Database 116 uses one or more of a plurality of techniques known in the art to store a plurality of information. In the depicted embodiment, database 116 resides on server 110. In another embodiment, database 116 may reside elsewhere within HVAC environment 100, provided that HVAC component 111 has access to database 116. Database 116 may store information associated with, but is not limited to, knowledge corpus, i) thermodynamic models, ii) energy mass balance equation, iii) ideal models associated with a zone based on parameters, iv) HVAC control setting, v) weather forecast and vi) historical data including previous thermodynamic model, weather forecast, occupancy requirement for a zone.

Figure 2:
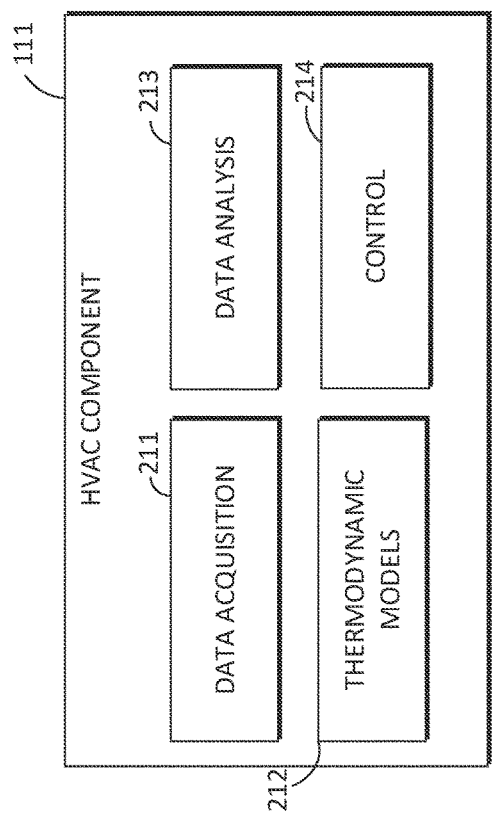
FIG. 2 is a functional block diagram illustrating the subcomponents of HVAC component 111, designated as 200, in accordance with an embodiment of the present invention.

FIG. 2 is a functional block diagram illustrating HVAC component 111, designated as 200, in accordance with an embodiment of the present invention. In the depicted embodiment, HVAC component 111 includes data acquisition component 211, thermodynamic models component 212, data analysis component 213 and control component 214.

As is further described herein below, data acquisition component 211 of the present invention provides the capability of collecting data from sensors 103 and collecting data related to zone parameters. It is noted that if there are some incomplete or missing sensor values, the system can compensate for the missing values and outliers by utilizing a median filtering approach. Zone parameters can include, but it is not limited to, dimension, insulation property, number of windows, number of walls, etc. of a room which can be extended to common areas or any areas covered by HVAC system. For example, a floor of a building has 10 windows and occupies a dimension of 100 meters by 100 meters. The floor will be primary used as an office space with an occupancy of 30 people. The zone parameter will include all the data related to that particular zone/floor (where it is serviced by an HVAC system).

As is further described herein below, thermodynamic models component 212 of the present invention provide the capability of generating ideal thermodynamic models for each area/zone of a room belonging to an infrastructure (e.g., building, home, stadiums, malls, etc.). The area/zone has a specific zone parameters, which can be retrieved from data acquisition component 211. The requirements (i.e., zone parameters) and an HVAC set point is what is necessary to calculate/determine the ideal thermodynamic model(s) for each zone. A set point can be defined as an ideal "climate setting" (etc. temperature, humidity, pressure, etc.) for a zone that is used by/for, but it is not limited to, comfortable for humans in an office setting, storing food without spoilage, comfortable for a restaurant environment, comfortable for cabin for travel (e.g., airplanes, trains, boats, etc.).

Thermodynamic models component 212 can use a simplified model below and can learn to create more complex models based on the desired set point of the room/zone:

$$T_{zone,t} = \beta_{zone,t-1} T_{zone,t-1} + FLW_t \cdot \sum_{i}^{t-k} \beta_{2i} RVP_i + \beta_3 RVP_i \cdot T_{sa,t}^{AHU} + \beta_4 \cdot T_{oat,t},$$

wherein, $T_{zone}$ is the zone temperature, RVP is the reheat valve, FLW is the Flow of the supplied air, $T_{sa}$ is the supply air temperature, $T_{oat}$ is the outside air temperature. The entire equation above can be expressed alternatively as:

$$y_{k,t} = \varphi_{k,t}^T \cdot \theta_{k,t} + \in_{k,t}$$

wherein, $y_{k,t}$ is the measurement from sensors 103, $\varphi_{k,t}$ is the regressor vector, $\theta_{k,t}$ is the parameter vector and $\in_{k,t}$ is the noise. The regressor vector ($\varphi_{k,t}$) is comprised of, $T_{zone}$, Flow RVP, Flow $T_{sa}$ and $T_{oa}$. The parameter vector ($\theta_{k,t}$) is compose of the coefficients 3.

After determining the ideal model, thermodynamic models component 212 can utilize the models to determine the predicted energy consumption of a zone covered by a HVAC system. Thermodynamic model component 212 can leverage existing thermodynamic calculation techniques based on thermodynamic laws and in combination of energy equations (mass-balance) to determine the predicted energy consumption.

Alternatively, thermodynamic models component 212 can leverage machine learning in order to help determine the ideal thermodynamic model for that zone based on several data analytic parameters such as, but it is not limited to, historical data for that zone, past, current and future weather data, past, current and future occupancy rate of the zone, past, current and future use of the zone (e.g., office setting, restaurants, shops, etc.).

As is further described herein below, data analysis component 213 of the present invention provides the capability of, i) dynamically balance the steady state of the energy equation of the ideal thermodynamic model(s), ii) localize faults and anomalies and iii) calculate the setting required by the HVAC in order to achieve the ideal steady state.

Regarding the functionality of i) ("dynamically balance the steady state of the energy equation"), data analysis component 213 retrieves the measurements from sensors 103 and plugs those reading into current ideal model for a zone. Data analysis component 213 commences to balance the model (i.e., achieve steady state) with the real time measurement reading. The outcome is either i) the model does balance or ii) the model does not balance. Data analysis component 213 can assign a binary score/rating (i.e., "YES" or "NO") to the outcome. For example, if the equation does not balance, then a "NO" score is assigned to the result. However, if the equation does balance, then a "YES" score is assigned to the result. It is noted that, data analysis component 213 can perform these calculations for all zones of a structure.

Data analysis component 213 determines if the result of the equation meets/equals a predetermined fault threshold. A predetermined fault threshold (e.g., "NO", "YES", etc.) is a user selectable threshold that allows the embodiment to determine if a fault exist or not. For example, the predetermined fault threshold is set to "NO". If the result of the calculation does not balance (i.e., assigned a "NO") then it does meet the fault threshold of "NO". If the result meets the predetermined fault threshold then a fault and/or anomalies exist.

Data analysis component 213, based on model's "NO" rating of meeting the fault threshold (i.e., not balancing out), can attempt to localize the faults and anomalies. Data analysis component 213 can trace back to location of the sensors (to locate the fault/anomaly) based on the current measurements. There can be two types of issues/fault/anomalies: 1) minor and 2) major. Minor faults can be something as simple as a low temperature reading but still within normal interval range (i.e., sensor did not malfunction). For example, someone left the window shades open on the floor and the sunshine warmed up the room very quickly (i.e., no clouds that day) and the steady state of the model was not achieved in a timely manner. A major fault can include, but it is not limited to, impossibility to set normal heating (temperature too high/too low), inappropriate ventilation and air conditioning due to the valve problem, broken air duct, stuck valve, furnace burner is out, malfunctioning sensor, condenser/chiller isn't circulating the refrigerant and etc.

Alternatively, data analysis component 213 can locate/detect abnormalities by using previously forecasted residuals and combine the residuals with online Bayesian change-points detection algorithms or combine with $Cu_{sum}$ test or SPRT among other change-points algorithms. The forecasted residuals can be derived from using any data analysis techniques such as online regression and deep learning.

Data analysis component 213 can calculate the setting required by the HVAC in order to achieve the ideal steady state. Data analysis component 213 can leverage machine learning in order to help calculate the setting based on several data analytic parameters such as, but it is not limited to, historical data for that zone, past, current and future weather data, past, current and future occupancy rate of the zone, past, current and future use of the zone (e.g., office setting, restaurants, shops, etc.).

As is further described herein below, control component 214 of the present invention provides the capability of i) notifying users of the anomaly/issue/faults and ii) sending commands to the HVAC system to adjust settings/parameters. In case of a notification, the embodiment can provide, a) the exact location of the concerned sensors and b) the associated physical component with the fault/issue. In case with a minor/simple issue, control component 214 can dynamically adjust the HVAC setting/parameters until the steady state is reached.

Figure 3:
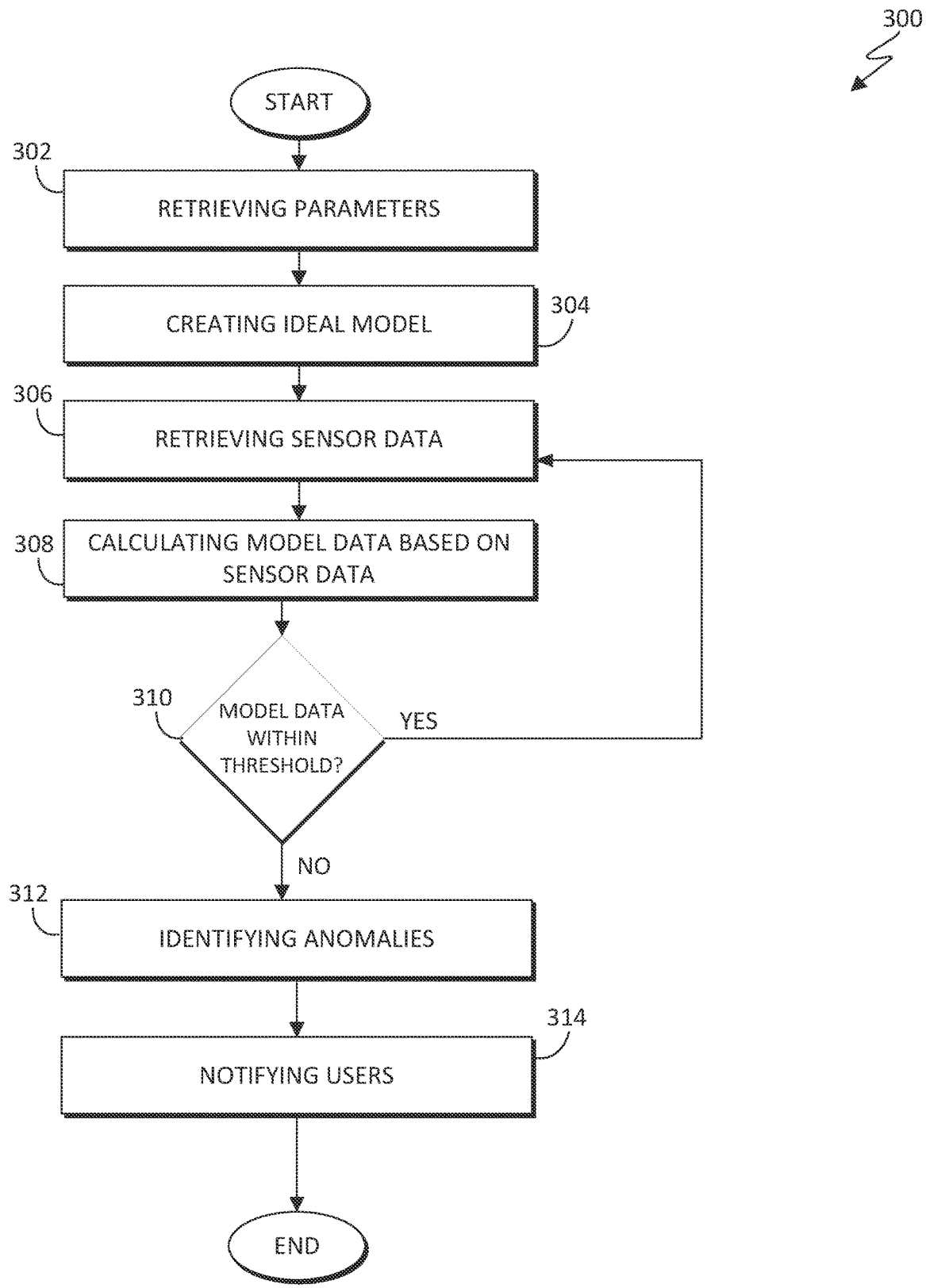
FIG. 3 is a high-level flowchart illustrating the operation of HVAC component 111, designated as 300, in accordance with an embodiment of the present invention.

FIG. 3 is a flowchart illustrating the operation of HVAC component 111, designated as 300, in accordance with another embodiment of the present invention.

HVAC component 111 retrieves parameters (step 302). In an embodiment, HVAC component 111, through data acquisition component 211, retrieves parameters associated with the zone. For example, a scenario will be used where there is a floor of a building has 10 windows and occupies a dimension of 100 meters by 100 meters. The floor will be primary used as an office space with an occupancy of 30 people. The zone parameter will include all the data related to that particular zone/floor (i.e., where it is serviced by an HVAC system).

HVAC component 111 creates an ideal thermodynamic model (step 304). In an embodiment, HVAC component 111, through thermodynamic models component 212, calculates the ideal model for a zone based on the zone parameters. For example, referring to the previous scenario of an office building to house 30 people, thermodynamic models component 212 generates the ideal model based on the zone requirement (i.e., 100 meters by 100 meters area with 10 windows for 30 people).

HVAC component 111 retrieves sensor data (step 306). In an embodiment, HVAC component 111, through data acquisition component 211, retrieves the sensors data associated with the zone. For example, referring to the previous scenario, the sensor data from floor (zone) is measured and retrieved by data acquisition component 211. The temperature sensor located in the middle of the floor is showing a reading of 78° Fahrenheit.

HVAC component 111 calculates the model based on the sensor data (step 3082). In an embodiment, HVAC component 111, through data analysis component 213, calculates the set point of the ideal thermodynamic model data using the current sensor values. HVAC component 111 can, plug one measurement from the sensor data back into the model to determine if there's any deviation. It can, iteratively, perform this "re-calculation" with the rest of the sensor data until all of measurement of the sensor data has been used. It is noted that, depending on the efficiency and CPU calculation capacity of the hardware, more than two sensor data can be plugged back into the ideal model at one time. In an example, referring to the previous scenario, the temperature reading of 78° F. is used to plug into the ideal model. However, the ideal model equation deviate from nominal values due to the sensor data of 78° F. Thus, data analysis component 213 assigns a binary rating of YES or NO, where "YES" means that the model does balance or "NO", the model does not balance.

HVAC component 111 determines if the model meets a predetermined fault threshold (step 310). In an embodiment, HVAC component 111, through data analysis component 213, determines if the rating of the model meets the predetermined threshold. For example, referring to the previous scenario, the rating of the calculated model is "NO" due to the sensor reading of 78° F. The predetermined threshold is "NO". Thus, the calculated model does meet the predetermined fault threshold (i.e., there is an imbalance in the model).

HVAC component 111 identifies the anomalies (step 312). In an embodiment, HVAC component 111, through data analysis component 213, identifies the fault and/or anomalies with the HVAC system. The system can determine whether the fault is minor or major before it can begin to locate the fault. For example, referring to the previous scenario where the temperature sensor read is 78° F. The reading is within a normal range of the sensor (i.e., not malfunctioned). Thus, the fault is a minor issue that does not require further investigation. Conversely, if the temperature sensor reads 78° F. for 10 minutes straight without changing and the HVAC system tried to adjust the HVAC system to cool the zone down then data analysis component 213 can re-classify the fault from MINOR to MAJOR. data analysis component 213 can attempt to locate the fault and anomaly as the cause to the temperature reading (assuming the temperature sensor did not malfunction). For example, the air flow sensor in the HVAC system saw a drop in air flow of the exhaust duct after sending a cooling command to the air conditioning unit portion of the HVAC system.

HVAC component 111 notifies the users (step 314). In an embodiment, HVAC component 111, through control component 214, notifies the user of the fault/anomaly. The user can be notified by a screen dashboard with color-coded icons (i.e., each color showing a fault or normal operation) corresponding to various sensors/HVAC equipment. The user can also be notified/alert via email, smart phone and smart watch. For example, referring to the previous scenario where the loss/lowered air flow of the exhaust duct of the air conditioning unit is detected, the user is notified via smart-phone app on the fault location. If it was a minor fault then, HVAC component 111, through control component 214, can adjust the setting (i.e. send a cooling command to the HVAC system) without alerting the users.

Figure 4:
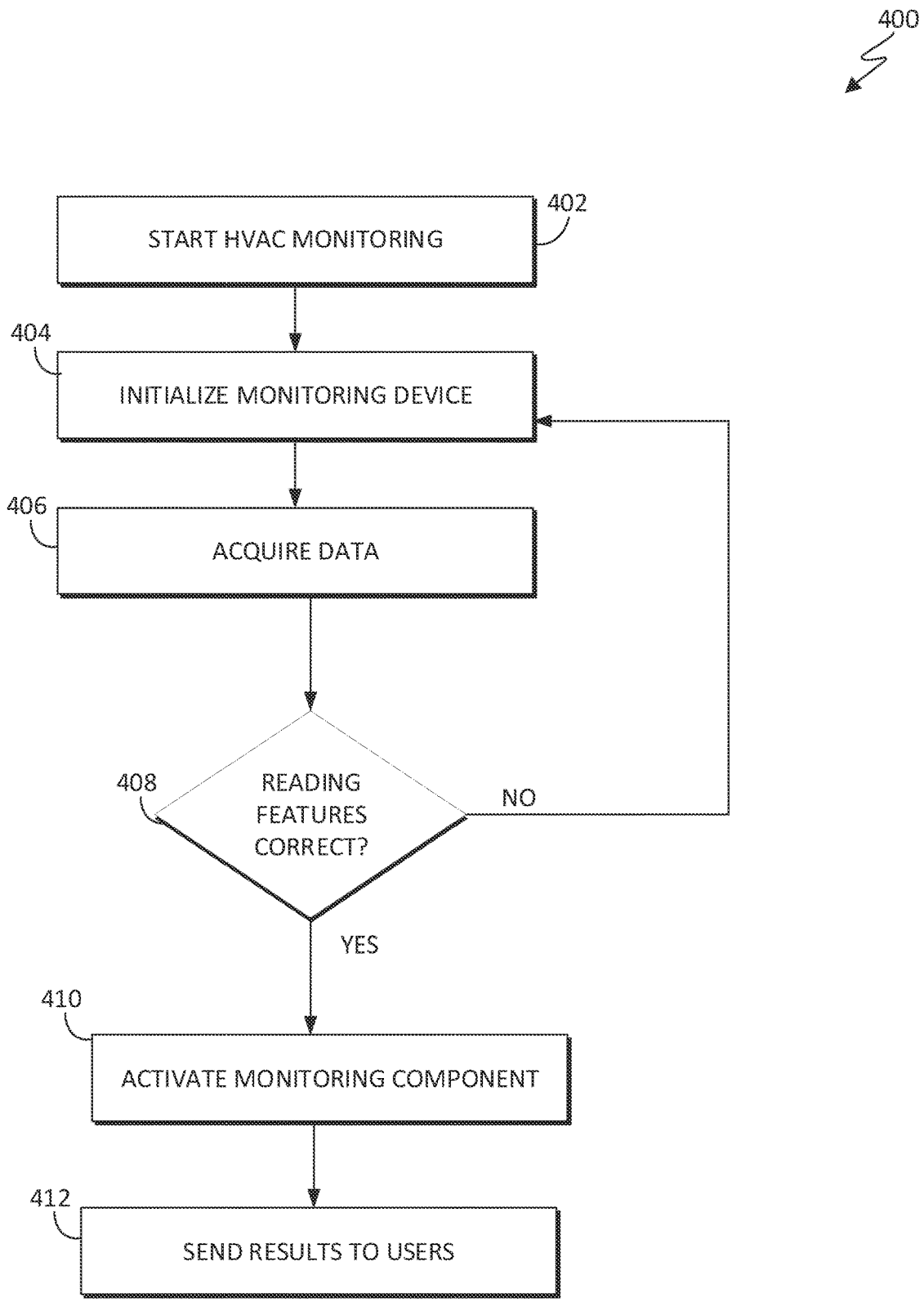
FIG. 4 is another high-level flowchart illustrating the operation of HVAC component 111, designated as 400, in accordance with an alternative embodiment of the present invention.

FIG. 4 is another high-level flowchart illustrating the operation of HVAC component 111, designated as 400, in accordance with an alternative embodiment of the present invention. The HVAC monitoring architecture can be summarized by the following features/characteristics: i) records measurements, ii) develop physical model, iii) perform prediction, iv) monitor individual parameters, v) determine residuals and vi) detects abnormal energy consumption.

In an embodiment, HVAC component 111 starts HVAC monitoring (step 402).

In an embodiment, HVAC component 111 initialize monitoring device (step 404). Sensors 103 are initialized or queried by the system to ensure that sensors are working and online.

In an embodiment, HVAC component 111 acquires data (step 406). System receives data from sensors 103.

In an embodiment, HVAC component 111 determines if reading features are correct (decision block 408). System can refer to historical data to ensure that reading from sensors 103 are within a "normal" and/or average reading. If system determines that the reading are out of above or below normal ("NO", branch of decision block 408) then system can return to step 404 to reinitialized sensors 103. If system determines that the reading are with the normal ("YES", branch of decision block 408) then system can proceed to step 410.

In an embodiment, HVAC component 111 activate monitoring component (step 410). Monitoring component performs the following steps, i) data cleaning, ii) develop physical model (i.e., prediction of parameters based on prediction algorithm) and iii) detect change-point based on detection of parametric residuals. Data cleaning process detects potential missing values and outliers and compensate them by using a median filter or any other interpolation method.

Prediction algorithm uses physical modeling and a machine learning algorithm (potentially with adaptive tuning parameters such as the regularization) to predict HVACs parameters. During the prediction step residuals are generated, difference between real measurements and estimated measurements, for each physical parameter. Once residuals start deviating from their normal nominal values, zeros, new tuning parameters are estimated, to accelerate the convergence and allow fast detection of abnormal energy consumption.

Residuals generation can be summarized by the following steps/characteristics: i) Perform the prediction of HVACs measurements to generate residuals and ii) determine the physical model. Determining a physical model can include the use of online Kernel methods, online regression, online deep learning or adaptive regularization or sliding windows. It is noted that there is a trade-off between stability and fast tracking.

Prediction algorithm can be summarized by the following steps: i) receive HVAC variables, ii) compute the predicted outputs and the residuals, iii) determine whether the parametric residuals is deviating from the normal values and iv) if the parametric residuals are deviating then update the tuning parameters, otherwise, go back to compute the predicted output and the residuals.

Once the monitoring component has been activated, if there's a deviation from the normal values of the parametric residuals then either the system can i) apply the new setting by updating the tuning parameters or ii) create a report/notification of the new tuning parameters.

In an embodiment, HVAC component 111 send results to users (step 412). If there are updated tuning parameter calculated due to the HVAC deviation then that is sent to the users.

Alternatively, HVAC component 111 can notify the users of the deviation by a way of display. For example, there is an issue within the HVAC system of building A. An operator has a dashboard showing the monitoring results of the HVACs of building A. Each HVAC (each floor) is associated to a green color as long as there is no anomaly, this comes from the parameter of the model in normal operating condition. The anomaly (i.e., faults) can be preprogrammed (via an AI algorithm) during the initial setup where certain colors can denote an issue with certain portion of the HVAC system. For example, when the color shift from green to red then the operator considers there is a problem for the associated HVAC and the problem is linked to the damper. If the color is blue then the fault is associated to the valve. The change in color is encoded at the level of the AI algorithm, where classification of faults is by colors. The information is relayed to the operator via the dashboard.

Figure 5:
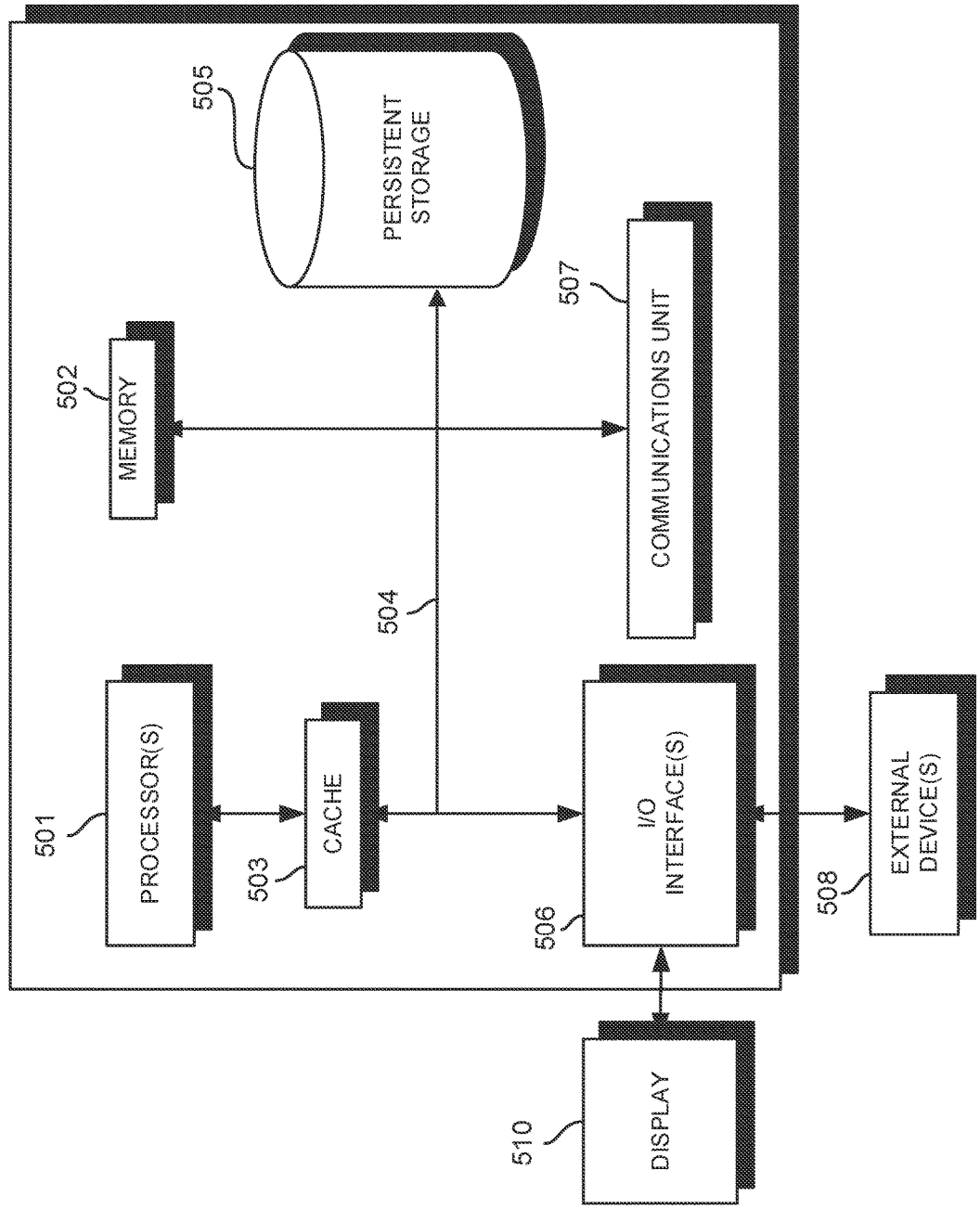
FIG. 5 depicts a block diagram, designated as 500, of components of a server computer capable of executing the HVAC component 111 within the HVAC environment 100, in accordance with an embodiment of the present invention.

FIG. 5, designated as 500, depicts a block diagram of components of HVAC component 111 application, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

FIG. 5 includes processor(s) 501, cache 503, memory 502, persistent storage 505, communications unit 507, input/output (I/O) interface(s) 506, and communications fabric 504. Communications fabric 504 provides communications between cache 503, memory 502, persistent storage 505, communications unit 507, and input/output (I/O) interface(s) 506. Communications fabric 504 can be implemented with any architecture designed for passing data and/or control information between processors (such as microprocessors, communications and network processors, etc.), system memory, peripheral devices, and any other hardware components within a system. For example, communications fabric 504 can be implemented with one or more buses or a crossbar switch.

Memory 502 and persistent storage 505 are computer readable storage media. In this embodiment, memory 502 includes random access memory (RAM). In general, memory 502 can include any suitable volatile or non-volatile computer readable storage media. Cache 503 is a fast memory that enhances the performance of processor(s) 501 by holding recently accessed data, and data near recently accessed data, from memory 502.

Program instructions and data (e.g., software and data x10) used to practice embodiments of the present invention may be stored in persistent storage 505 and in memory 502 for execution by one or more of the respective processor(s) 501 via cache 503. In an embodiment, persistent storage 505 includes a magnetic hard disk drive. Alternatively, or in addition to a magnetic hard disk drive, persistent storage 505 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 505 may also be removable. For example, a removable hard drive may be used for persistent storage 505. Other examples include optical and magnetic disks, thumb drives, and smart cards that are inserted into a drive for transfer onto another computer readable storage medium that is also part of persistent storage 505. HVAC component 111 can be stored in persistent storage 505 for access and/or execution by one or more of the respective processor(s) 501 via cache 503.

Communications unit 507, in these examples, provides for communications with other data processing systems or devices. In these examples, communications unit 507 includes one or more network interface cards. Communications unit 507 may provide communications through the use of either or both physical and wireless communications links. Program instructions and data (e.g., HVAC component 111) used to practice embodiments of the present invention may be downloaded to persistent storage 505 through communications unit 507.

I/O interface(s) 506 allows for input and output of data with other devices that may be connected to each computer system. For example, I/O interface(s) 506 may provide a connection to external device(s) 508, such as a keyboard, a keypad, a touch screen, and/or some other suitable input device. External device(s) 508 can also include portable computer readable storage media, such as, for example, thumb drives, portable optical or magnetic disks, and memory cards. Program instructions and data (e.g., HVAC component 111) used to practice embodiments of the present invention can be stored on such portable computer readable storage media and can be loaded onto persistent storage 505 via I/O interface(s) 506. I/O interface(s) 506 also connect to display 510.

Display 510 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for identifying faults within a HVAC system, the computer-implemented method comprising:
    retrieving, by a one or more computer processors, one or more parameters associated with a zone;
    creating, by the one or more computer processors, a first thermodynamic model for the zone based on the one or more parameters further comprising:
        determining, by the one or more computer processors, a set point based on the one or more parameters, wherein the one or more parameters further comprises, dimension, insulation property, number of windows and number of walls of the zone, and
        calculating, by the one or more computer processors, the first thermodynamic model of the zone based on the set point;
    retrieving, by the one or more computer processors, a plurality of sensor data associated with a plurality of sensors from an HVAC system associated with the zone;
    calculating, by the one or more computer processors, model data representing a first portion of the plurality of sensor data based on executing the first thermodynamic model with a second portion of the plurality of sensor data further comprising:
        determining, by the one or more computer processors, of a deviation from the set point of the model data against the first thermodynamic model based on the plurality of sensor data; and
        responsive to the deviation, assigning, by the one or more computer processors, a binary rating of "NO" to a result of the model data;
    determining, by the one or more computer processors, if the model data is equal to a predetermined fault threshold, wherein the predetermined fault threshold is set to "NO" further comprising:
        comparing, by the one or more computer processors, the result of the model data against the predetermined fault threshold, wherein the predetermined fault threshold is "NO" and the result of the model data is the binary rating of "NO" rating; and
        responsive to the comparison matching, concluding, by the one or more computer processors, the model data does match the predetermined fault threshold;
    responsive to the model data does not equal to the predetermined fault threshold, identifying, by the one or more computer processors, one or more faults based on an identity of the first portion of the plurality of sensor data; and
    notifying, by the one or more computer processors, one or more users based on the identified one or more faults.

2. The computer-implemented method of claim 1, further comprising:
    calculating, by the one or more computer processors, an HVAC setting based on the first thermodynamic model and the second portion of the plurality of sensor data; and
    dynamically adjusting, by the one or more computer processors, the HVAC setting on the HVAC system based on the calculated HVAC setting.

3. The computer-implemented method of claim 1, wherein identifying one or more faults based on an identity of the first portion of the plurality of sensor data, further comprising:
  determining, by the one or more computer processors, if the one or more fault is a minor fault or a major fault; and
  responsive, by the one or more computer processors, to determining that the fault is a major fault, locating a corresponding HVAC device to the plurality of sensor data.

4. The computer-implemented method of claim 3, wherein notifying one or more users based on the identified one or more faults, further comprising:
  sending, by the one or more computer processors, a notification to one or more users with a list of corresponding HVAC device to the plurality of sensors.

5. A computer program product for managing HVAC system, the computer program product comprising:
  one or more computer readable storage media and program instructions stored on the one or more computer readable storage media, the program instructions comprising:
    program instructions to retrieve one or more parameters associated with a zone;
    program instructions to create a first thermodynamic model for the zone based on the one or more parameters further comprising:
      program instructions to determine a set point based on the one or more parameters, wherein the one or more parameters further comprises, dimension, insulation property, number of windows and number of walls of the zone, and
      program instructions to calculate the first thermodynamic model of the zone based on the set point;
    program instructions to retrieve a plurality of sensor data associated with a plurality of sensors from an HVAC system associated with the zone;
  program instructions to calculate model data representing a first portion of the plurality of sensor data based on executing the first thermodynamic model with a second portion of the plurality of sensor data, further comprising:
    program instructions to determining of a deviation from the set point of the model data against the first thermodynamic model based on the plurality of sensor data; and
    responsive to the deviation, program instructions to assign a binary rating of "NO" to a result of the model data;
    program instructions to determine if the model data is equal to a predetermined fault threshold, wherein the predetermined fault threshold is set to "NO", further comprising:
      program instructions to compare the result of the model data against the predetermined fault threshold, wherein the predetermined fault threshold is "NO" and the result of the model data is the binary rating of "NO" rating; and
      responsive to the comparison matching, program instructions to conclude the model data does match the predetermined fault threshold;
      responsive to the model data does not equal to the predetermined fault threshold, program instructions to identify one or more faults based on an identity of the first portion of the plurality of sensor data; and
    program instructions to notify one or more users based on the identified one or more faults.

6. The computer program product of claim 5, further comprising:
  program instructions to calculate an HVAC setting based on the first thermodynamic model and the second portion of the plurality of sensor data; and
  program instructions to dynamically adjust the HVAC setting on the HVAC system based on the calculated HVAC setting.

7. The computer program product of claim 5, wherein program instructions to identify one or more faults based on an identity of the first portion of the plurality of sensor data, further comprising:
  program instructions to determine if the one or more fault is a minor fault or a major fault; and
  responsive to determining that the fault is a major fault, program instructions to locate a corresponding HVAC device to the plurality of sensor data.

8. The computer program product of claim 7, wherein program instructions to notify one or more users based on the identified one or more faults, further comprising:
  program instructions to send a notification to one or more users with a list of corresponding HVAC device to the plurality of sensors.

9. A computer system for maintaining industrial livestock infrastructure, the computer system comprising:
  one or more computer processors;
  one or more computer readable storage media;
  program instructions stored on the one or more computer readable storage media for execution by at least one of the one or more computer processors, the program instructions comprising:
    program instructions to retrieve one or more parameters associated with a zone;
    program instructions to create a first thermodynamic model for the zone based on the one or more parameters further comprising:
      program instructions to determine a set point based on the one or more parameters, wherein the one or more parameters further comprises, dimension, insulation property, number of windows and number of walls of the zone, and
      program instructions to calculate the first thermodynamic model of the zone based on the set point;
    program instructions to retrieve a plurality of sensor data associated with a plurality of sensors from an HVAC system associated with the zone;
  program instructions to calculate model data representing a first portion of the plurality of sensor data based on executing the first thermodynamic model with a second portion of the plurality of sensor data, further comprising:
    program instructions to determining of a deviation from the set point of the model data against the first thermodynamic model based on the plurality of sensor data; and
    responsive to the deviation, program instructions to assign a binary rating of "NO" to a result of the model data;
    program instructions to determine if the model data is equal to a predetermined fault threshold, wherein the predetermined fault threshold is set to "NO", further comprising:
      program instructions to compare the result of the model data against the predetermined fault threshold, wherein the predetermined fault threshold is "NO" and the result of the model data is the binary rating of "NO" rating; and responsive to the comparison matching, program instructions to conclude the model data does match the predetermined fault threshold;

responsive to the model data does not equal to the predetermined fault threshold, program instructions to identify one or more faults based on an identity of the first portion of the plurality of sensor data; and program instructions to notify one or more users based on the identified one or more faults.

10. The computer system of claim 9, further comprising:

program instructions to calculate an HVAC setting based on the first thermodynamic model and the second portion of the plurality of sensor data; and program instructions to dynamically adjust the HVAC setting on the HVAC system based on the calculated HVAC setting.

11. The computer system of claim 9, wherein program instructions to identify one or more faults based on an identity of the first portion of the plurality of sensor data, further comprising:

program instructions to determine if the one or more fault is a minor fault or a major fault; and responsive to determining that the fault is a major fault, program instructions to locate a corresponding HVAC device to the plurality of sensors.

* * * * *